(No Model.) 5 Sheets—Sheet 1.
S. H. COTTRELL.
FERTILIZER DISTRIBUTER.
No. 376,731. Patented Jan. 24, 1888.
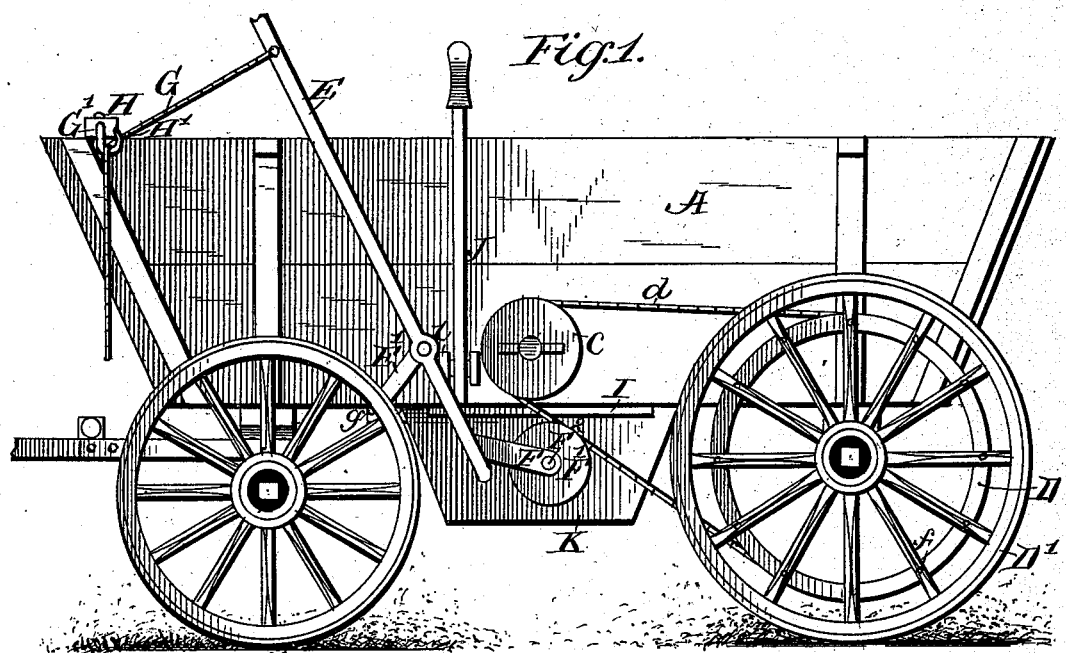
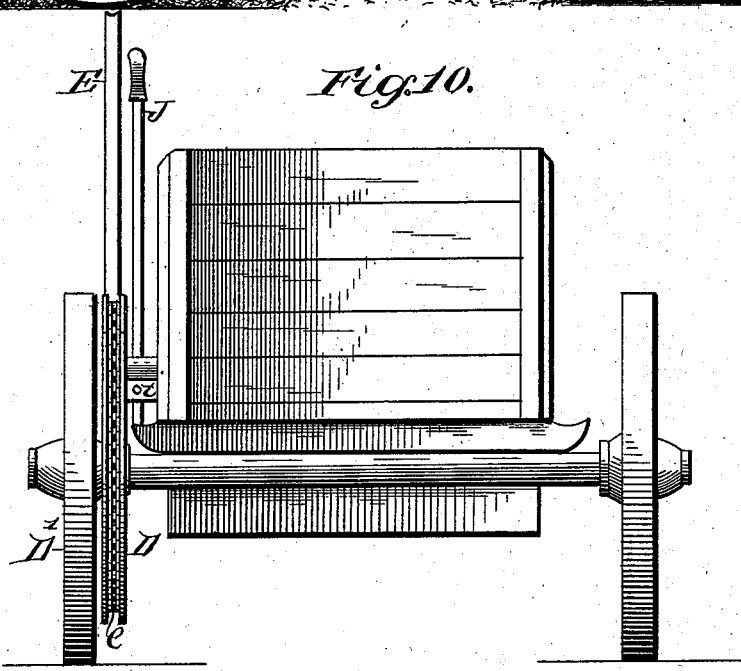
Witnesses
O. Fred Heller
H. J. England.
Inventor
Samuel H. Cottrell.
by E. H. Geleton,
Attorney (No Model.) 5 Sheets—Sheet 2.

S. H. COTTRELL.
FERTILIZER DISTRIBUTER.

No. 376,731. Patented Jan. 24, 1888.

Witnesses
C. Fred Keller
H. J. England

Inventor
Samuel H. Cottrell
by E. H. Gelston,
Attorney (No Model.) 5 Sheets—Sheet 3.
S. H. COTTRELL.
FERTILIZER DISTRIBUTER.
No. 376,731. Patented Jan. 24, 1888.
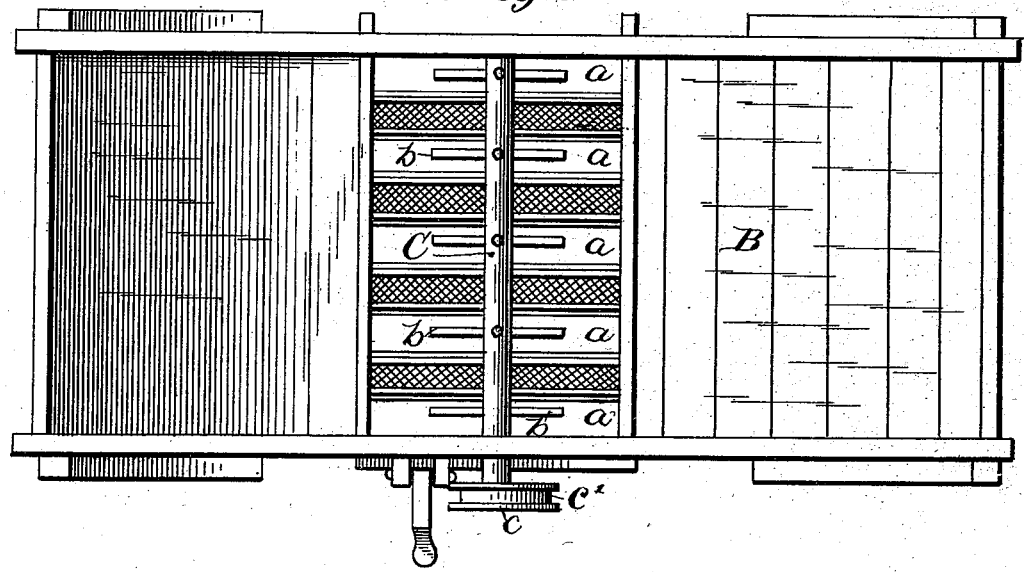
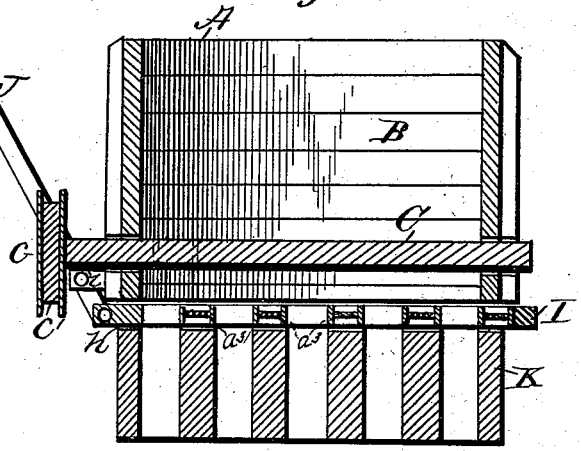
Witnesses
Inventor
Samuel H. Cottrell.
by E. H. Geleton,
Attorney (No Model.)　　　　　　　　　　　　　　　　　　5 Sheets—Sheet 4.
S. H. COTTRELL.
FERTILIZER DISTRIBUTER.

No. 376,731.　　　　　　　　　Patented Jan. 24, 1888.

Witnesses
　Fred. Kellor
　H. J. England.

Inventor
　Samuel H. Cottrell
　by E. H. Gelston
　　　Attorney (No Model.)
S. H. COTTRELL.
FERTILIZER DISTRIBUTER.
No. 376,731. Patented Jan. 24, 1888.
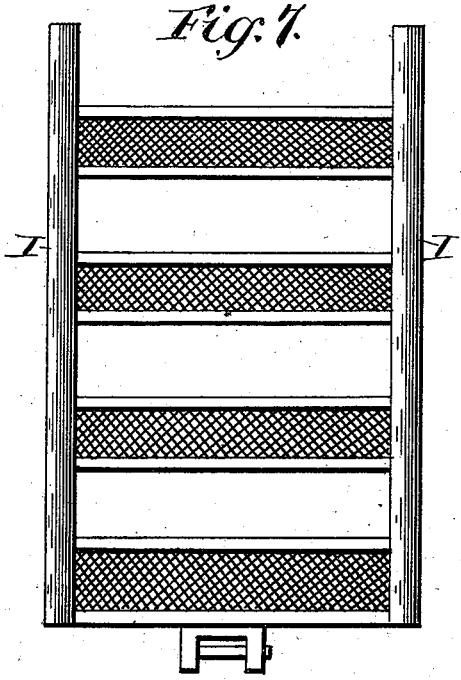
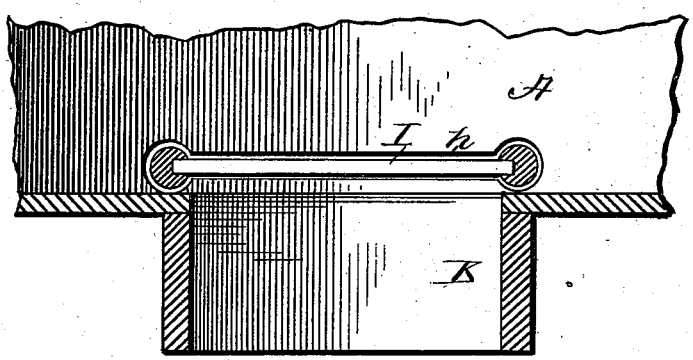
Witnesses
Fred Heller
H. J. England.
Inventor
Samuel H. Cottrell.
by E. H. Gelston,
Attorney

UNITED STATES PATENT OFFICE.

SAMUEL HARNEY COTTRELL, OF RAMSEY, ALABAMA.

FERTILIZER-DISTRIBUTER.

SPECIFICATION forming part of Letters Patent No. 376,731, dated January 24, 1888.

Application filed September 16, 1887. Serial No. 249,841. (No model.)

*To all whom it may concern:*

Be it known that I, SAMUEL HARNEY COTTRELL, a citizen of the United States, residing at Ramsey, in the county of Sumter and State of Alabama, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in fertilizer-distributers; and it consists in a farm-wagon provided with a hopper-shaped bottom with slots, a cross-shaft working within said box, suitable levers, and mechanism for operating said shaft.

The object of my invention is to evenly distribute the fertilizer from a wagon in rows of different widths, or evenly in rows on the surface of the ground, and, further, to thoroughly mix the same during the process of distribution. I attain these objects by means of the peculiar construction and arrangement of the various parts of my invention, which will be more fully pointed out and described in the specification and claim, reference being had to the drawings accompanying this application and forming part of the same, in which—

Figure 5:
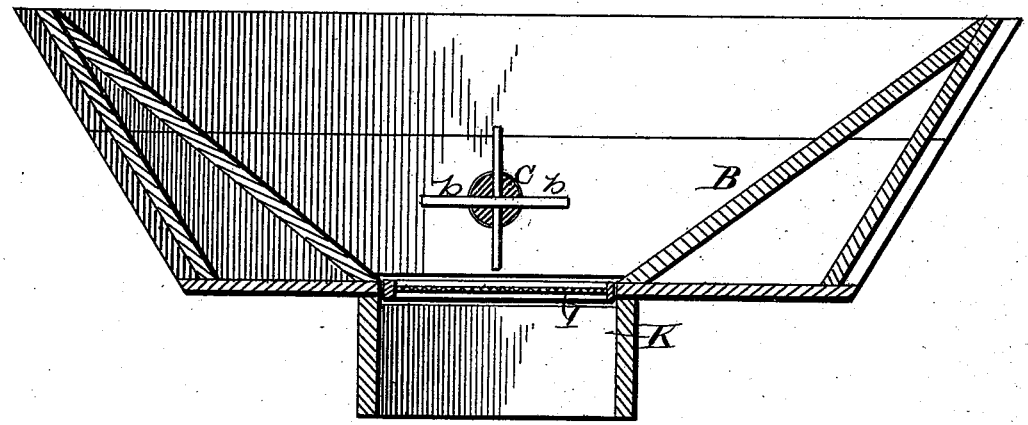
Figure 2:
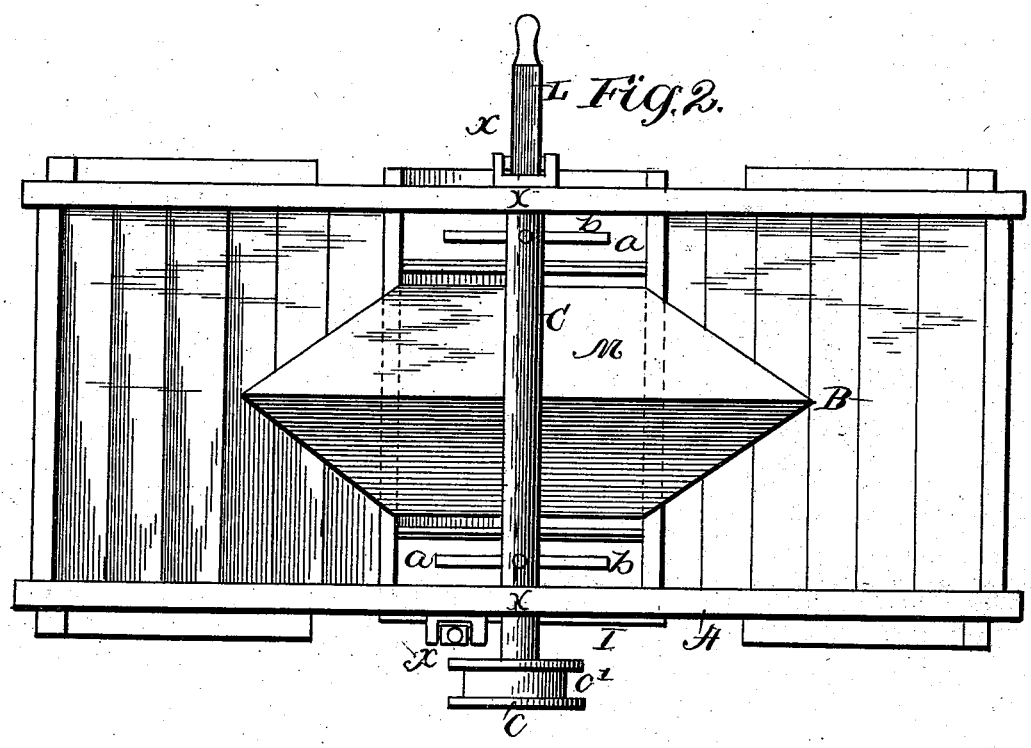
Figure 9:
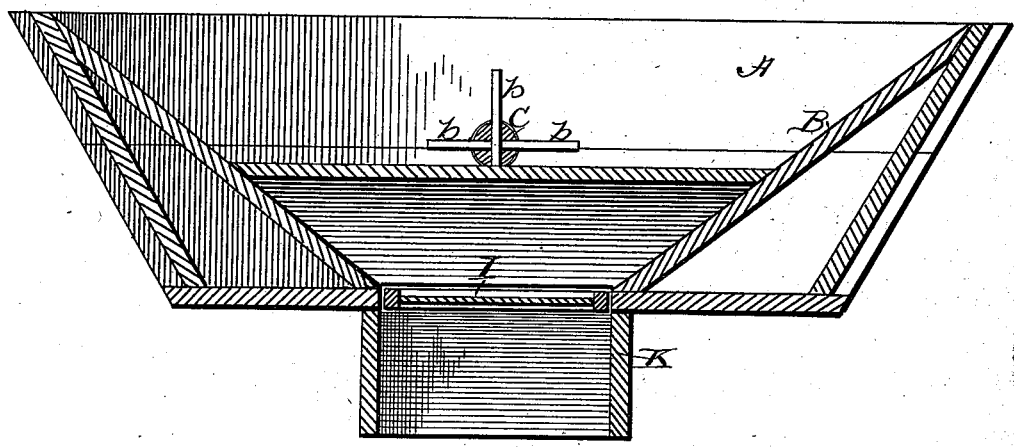
Figure 6:
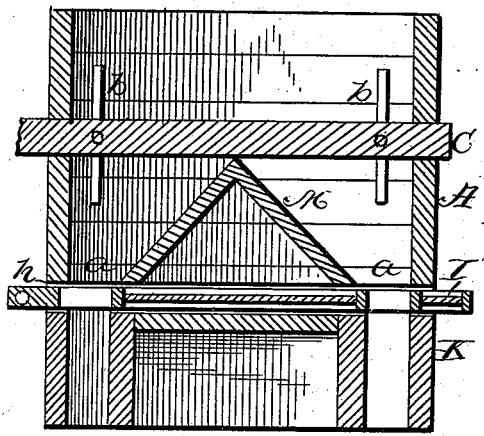

Figure 1 is a side elevation of my invention, showing a wagon with drive-wheels and levers in place. Fig. 2 is a top plan view of the same, showing central incline or deflector with slots on each side. Fig. 3 is a top plan view, showing slotted bottom incline or deflector removed. Fig. 4 is a cross-sectional view. Fig. 5 is a longitudinal sectional view. Fig. 6 is a cross-sectional view taken on the line *x x* of Fig. 2. Figs. 7 and 8 are detail views. Fig. 9 is a longitudinal section of Fig. 2. Fig. 10 is a rear elevation of my invention.

Similar letters refer to like parts throughout the drawings.

Referring to the drawings, A represents a wagon-body mounted on wheels in the usual form.

The inside of box or body A is provided with an inwardly-inclined hopper, B, the outer ends of which extend to the ends and sides of body A, near its outer edges. The bottom of hopper B is formed with slots *a*, which extend longitudinally with the body A, said body having an opening into which the lower portion of hopper B is inserted. Crosswise through hopper B and body A extends a shaft, C, which is provided with projecting arms or agitators *b*, that are formed to extend into slots *a* when shaft C is revolved. Said shaft C is journaled in the sides of body B, and extends centrally a suitable distance above slots *a*.

Shaft C extends outward on one side of body A, terminating in a square end, to which is secured a pulley, *c*, that is provided with a grooved periphery, *c'*, to receive a drive-chain, *d*, that extends rearward and passes around a drive-wheel rim, D, that is formed with an inclined grooved periphery, *e*, said wheel-rim D being secured to the inner face of wheel D', by means of clips or clamp-bolts *f*, passing through the rim of wheel D and around or through the spokes of wheel D', said wheel D' being one of the rear bearing-wheels. A lever, E, is pivoted near its lower end to the outer end of a bracket, E', and the inner end of said bracket is secured to the under face of body A, by means of screw-bolts *g*. To the lower end of lever E is rigidly secured an inclined rearwardly-projecting bracket, F, its outer end being slotted to receive an idler or pulley, F', which is centrally held and permitted to revolve by pivot-pin F², the periphery of said pulley F' being formed with an inclined groove in conformity with wheels *c* and D, the purpose of said pulley being to work against chain *d* and tighten the same when lever E is tilted forward. The upper end of lever E is secured to one end of chain G, and the opposite end of said chain is secured to the front end of body A by staple or bolt G', the purpose of chain G being to prevent lever E from tilting rearward and to hold the lever E at the right inclination forward when pulley F' is forced against chain *d* to tighten the same.

A projecting bracket, H, is secured to the top of body A, at the front end, by bolts, its outer end being formed with a hook, H', that is fitted to engage with the links in chain G, and when the outer end of lever E is drawn toward the front of body A, chain G is drawn tight and engaged with hook H', by means of which lever E is held inclined forward and the pulley F' is forced against the chain d, tightening the same, so that when the wagon moves forward, wheel-rim D will turn pulley c.

A slotted sliding board, I, having alternate sieve-openings $a^3$, as shown in Figs. 3 and 4, is loosely fitted in slots a, and is held in place by side flanges or keepers, h, and it is arranged to move outward and inward to open or cover said slots a, as desired, by means of a lever, J, which is pivoted near its lower end to a bracket, i, which is secured to body A by bolts. By this construction the holes a are covered by the sieves in the sliding board, whereby the pulverized fertilizer passes down through said sieves in fine powder form in the best possible condition to be utilized as plant-food. After passing through said sieves it is evenly distributed on the ground or in the rows. The lower end of said lever J is pivoted to the outer side of sliding board I, and projects upward vertically above body A.

A chute or deflector-board, K, is secured to the bottom of body A, and on each side under the outside slots, a, for the purpose of deflecting the fertilizer into the rows opened to receive the same. A lever, L, is placed on the opposite side of body A and secured in like manner to lever J. Where only two rows or furrows are to receive the fertilizer, one on each side of body A, then an upwardly-inclined bottom, M, is placed inside of hopper B, which deflects the fertilizer outward to the two outside slots in body A or hopper B.

The operation of my device is as follows: The fertilizer is placed in wagon-body A, (the furrows in the ground being previously opened by plows.) The team is attached to the wagon. The end of lever E is drawn down toward the front of body A, thus forcing pulley F' against chain d, tightening the same. The wagon is moved forward along the furrows. Lever J is forced outward, moving board I inward, opening slots a, when, by means of deflector K, the fertilizer is distributed in the rows or furrows.

Having thus described my invention, what I claim, and desire to secure by Letters Patent, is—

In a fertilizer-distributer, an inclined hopper with slotted bottom, an inclined deflector within said hopper, a cross shaft with projections working above said deflector, a slotted slide-board having alternate sieve-openings, a pivoted lever adapted to transversely move said board, and a rigid pulley on said cross-shaft, in combination with one of the rear wheels having a grooved band-wheel secured thereto, a chain connecting said band-wheel with said pulley, and a lever carrying an idler-pulley working against the lower face of said chain, substantially as shown and described.

In testimony whereof I affix my signature in presence of two witnesses.

SAMUEL HARNEY COTTRELL.

Witnesses:
J. C. PARHAM,
S. A. STEWART.